United States Patent [19]

Newman et al.

[11] 4,313,996

[45] Feb. 2, 1982

[54] FORMABLE METAL-PLASTIC-METAL STRUCTURAL LAMINATES

[75] Inventors: Ritchey O. Newman; James K. Rieke; Donald R. Wright, all of Midland, Mich.

[73] Assignee: The Dow Chemical Company, Midland, Mich.

[21] Appl. No.: 41,441

[22] Filed: May 21, 1979

[51] Int. Cl.$^3$ .................. B32B 7/02; B32B 15/08; B29C 19/00

[52] U.S. Cl. .................. 428/215; 156/199; 156/244.27; 156/313; 220/450; 428/218; 428/332; 428/246; 428/461; 428/462; 428/623; 428/626

[58] Field of Search .............. 428/215, 246, 461, 462, 428/332, 218, 623, 626; 156/313, 199, 244.27, 224, 226; 220/450; 229/3.5 R; 148/6.2, 6.27

[56] References Cited

U.S. PATENT DOCUMENTS

| | | | |
|---|---|---|---|
| 3,298,559 | 1/1967 | Lurie .................. | 220/450 |
| 3,340,714 | 9/1967 | Pohl et al. .................. | 156/224 X |
| 3,348,995 | 10/1967 | Baker et al. .................. | 428/215 |
| 3,382,136 | 5/1968 | Bugel et al. .................. | 428/215 |
| 3,542,605 | 11/1970 | Harvey .................. | 148/6.2 |
| 3,594,249 | 7/1971 | Mueller-Tamm et al. .................. | 156/199 |
| 3,616,019 | 10/1971 | Mueller-Tamm et al. .................. | 156/244.27 |
| 3,711,365 | 1/1973 | Pyle .................. | 428/461 |
| 3,721,597 | 3/1973 | Colburn .................. | 156/313 |
| 3,826,628 | 7/1974 | Addinoll et al. .................. | 428/623 |
| 4,115,619 | 9/1978 | Kurfman et al. .................. | 428/461 X |
| 4,229,504 | 10/1980 | Brachman .................. | 428/462 X |

FOREIGN PATENT DOCUMENTS 2038239 7/1980 United Kingdom.

OTHER PUBLICATIONS

Pohl et al., Modern Plastics, 41, Mar. 7, 1964, pp. 119-124.

*Primary Examiner*—Thomas J. Herbert, Jr.
*Attorney, Agent, or Firm*—T. S. Choo; S. S. Grace

[57] ABSTRACT

A metal-plastic-metal structural laminate which can be formed into various useful articles having compound curves using conventional metal forming techniques. The laminate comprises two metal skin layers and a centrally disposed polymer layer comprising a core layer, and optionally first and second adhesive layers. Each metal skin layer is 2 to 20 mils, the ratio of the core thickness to skin thickness is less than 9:1 and the total laminate thickness is 5 to 65 mils. The laminate can be bent to 90° to a critical radius, the distance between the pivot point and the inner skin surface of the laminate, without metal rupture.

18 Claims, No Drawings

FORMABLE METAL-PLASTIC-METAL STRUCTURAL LAMINATES

BACKGROUND OF THE INVENTION

This invention relates to laminates of metal and plastic and to their preparation. More particularly, this invention relates to novel metal-plastic-metal structural laminates which can be formed into various useful articles having compound curves using conventional metal forming techniques.

Metal plastic laminates are well known items of commerce. They include relatively thin laminates useful in flexible packaging end use applications as well as relatively thick laminates used as construction materials. Methods of preparing such laminates are also known. One method includes bringing at least one layer of plastic and at least one layer of metal into intimate contact and subjecting them to suitable heat and pressure, using, for example, a molding press. A more efficient and continuous method involves the well known extrusion processes—extrusion coating or extrusion lamination. Often an intermediate layer of adhesive or primer, in the form of a film or coating, is used in conjunction with these methods to ensure adequate adhesion between the metal substrate and plastic.

Metal plastic laminates have also been the subject of numerous patents. An exemplary selection of such patents includes U.S. Pat. Nos. 3,298,559; 3,340,714; 3,348,995; 3,382,136; 3,542,605; 3,594,249; 3,616,019; 3,711,365; 3,721,597 and 3,826,628. Most metal plastic laminates known in the art are satisfactory for many commercial uses as stated above. However, such laminates lack, among other things, satisfactory formability.

Accordingly, it is an object of this invention to provide a metal-polymer-metal structural laminate capable of being formed into an article using, for example, conventional metal-forming equipment.

SUMMARY OF THE INVENTION

The laminate of the present invention comprises two metal skin layers and a centrally disposed polymer comprising a core layer and optionally first and second adhesive layers. More specifically, the laminate comprises a core of polymeric resinous material having tightly adhered to each side thereof a metal skin layer wherein each metal skin layer is from about 2 to about 20 mils thick, the ratio of the core thickness to skin thickness is less than 9:1 and the total laminate thickness is from about 5 to about 65 mils. The materials of construction of the polymer core and the metal skins and the geometry of the laminate are such that the laminate has (1) a flexural stiffness at least about 40 percent that of the solid metal of the skin layer of the lower modulus having the same thickness as the laminate as measured by ASTM D-790 on a one inch wide sample having four inch span under three point loading conditions, (2) a density from about 25 percent to 90 percent that of the average of two solid metal skin layers, (3) as a measure of stretch formability, a "limiting dome height" of at least about 60 percent of the limiting dome height of the solid metal of the skin layer of the lower ultimate elongation having the same thickness as the laminate, (4) the capability of being subjected to a no load oven test, subsequent to forming of the laminate, at a temperature of at least 190° F. for a period of 30 minutes without delamination, and (5) the capability of being bent at room temperature to 90° to a critical radius without metal rupture. The critical radius, defined as the distance from the pivot point to the inner skin surface of the laminate, is about equal to the total laminate thickness.

As used herein, the term "limiting dome height" is that height measured when testing sheet metal blank or laminate blanks in accordance with General Motors Corporation test procedures described in "Metal Progess", May 1975, pp. 52–54 and "Metals Engineering Quarterly", August 1975, pp. 53–57, using a blank width to clamp diameter ratio of about 1.0.

As used herein, the term "tightly adhered" means a lap shear value of at least about 500 psi at room temperature as measured by ASTM D 3165-73 using a lap length of about 0.25 inch.

DETAILED DESCRIPTION AND EMBODIMENT

Metal skin layers which are used in accordance with this invention each have a thickness from about 2 to about 20 mils and, preferably, from 5 to 15 mils. A metal skin layer can be formed, for example, from aluminum, aluminum alloys, alloy-clad aluminum, surface modified copper, bronze, magnesium or magnesium alloys, steel, tin-free steel, tin-plate steel, aluminized steel, stainless steel, surface modified copper-clad stainless steel, terneplate steel, galvanized steel, chrome or chrome treated steel and the like. These metals may also be surface treated or have thereon surface conversion coatings. A preferred group of metals is aluminum and aluminum alloys.

Another preferred group of metals is steel and steel alloys, particularly the chrome/chrome oxide coated steel substrate or so-called tin-free steel (TFS) described in Canadian Pat. No. 808,630 and U.S. Pat. Nos. 3,526,486 and 3,826,628, the teachings of which are hereby incorporated by reference. The thickness of discrete layers of chromium metal and chromium oxide may be controlled by varying plating bath parameters as is well known in the art.

The metal skin layers on each side of the core can be formed of the same metal or of different metals and can have same or different thicknesses.

The polymer core of this invention can be formed from any polymeric resinous material which when laminated to the metal skin layer, either directly thereto or by use of an intermediate adhesive layer, can pass a no load oven test without any delamination, after being subjected to a temperature of at least 190° F. for a period of 30 minutes. The polymer core can have a thickness from about 1 to about 61 mils, preferably from about 10 to 45 mils, inclusive of any adhesive layer(s) which may be employed. In general, rubber-type polymers are ineffective because of poor Glassy type polymers having room temperature brittleness are ineffective. Exemplary polymers within the present invention include homopolymers and copolymers of olefins such as ethylene, propylene and 4-methyl pentene-1; polymers of vinyl halides such as vinyl chloride; and copolymers of vinylidene chloride. Also suitable are cellulosic polymers such as ethyl cellulose, cellulose butyrate and cellulose acetate; polyamides such as nylon; polyesters such as poly(ethylene terephthalate); polycarbonates; thermoplastic epoxy resins; and polyurethanes. Especially preferred resinous materials are the ethylene polymers and copolymers and the propylene polymers and copolymers having a brittle temperature of less than about 30° F. (as measured by ASTM D-746) and a Vicat softening point of greater than about 170° F. (as measured by ASTM D-1875). Such materials include polypropylene, low density or high density polyethylene, ethylene/vinyl acetate copolymer, ethylene/acrylic acid copolymer, and ethylene/butene-1 and other alkene-1 copolymers.

The polymeric resinous materials of the core can be bonded directly to the metal skin layers or by the use of an intermediate adhesive layer therebetween. The intermediate adhesive layer can have a thickness from about 0.1 to 5 mils, preferably from about 0.3 to 2.5 mils. Such layer may be formed from any thermoplastic polymeric resinous material which will tightly adhere the core layer to the metal skin layers. A particularly preferred adhesive layer is a normally solid thermoplastic ethylene-based polymer modified by monomers having reactive carboxylic acid groups, particularly a copolymer of a major proportion of ethylene and a minor proportion, typically from 1 to 30, preferably from 2 to 20, percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer can also contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art. Specific examples of such copolymers are ethylene acrylic acid copolymer, ethylene methacrylic acid copolymer, ethylene maleic acid copolymer and the like.

The adhesive layer can first be applied to the metal skin layers, first be applied to the core, or can be applied to the metal skin layer and the core simultaneously. The adhesive layer can be applied using well known application techniques, such as, for example, solvent casting, roll coating, or, preferably, extrusion processes and the like. When the adhesive layer is to be combined with the core prior to the lamination thereof to the metal skins, such layers can advantageously be introduced into the laminates by the well known coextrusion process or combining the conventional extrusion process with a film lamination technique.

In one embodiment of this invention, the core of polymeric resinous material may be irradiated with a high energy ionizing radiation source to achieve at least a partial crosslinking thereof for improved creep properties and thermal stability.

In another embodiment of this invention, the core is made electroconductive by incorporating conductive particulates, e.g., carbon black and metal particles, thereinto. The conductive core enhances the weldability of the resulting metal-polymer-metal laminates.

In yet another embodiment of this invention, the core of polymeric resinous material contains at least one reinforcing element embedded therein to enhance the mechanical properties of the resulting laminates. Such elements can be made from glass fibers, a perforated metallic sheet, an expanded metallic sheet, or a metallic wire screen and the like.

Numerous solid fillers, pigments, lubricants, antioxidants and the like well known in the art can also be incorporated into the core or adhesive layers, provided the resultant laminate retains the hereinbefore prescribed characteristics.

In one embodiment of this invention, a metal-polymer-metal laminate is produced by disposing a layer of polymer resinous material, which layer is continuously extruded from a conventional, screw-type extruder, between two metallic skin layers which are fed continuously to a nip formed by a pair of opposing and counter-rotating laminating rolls. Heat and pressure sufficient to affect a bond between the metal skin layers and the polymeric resinous material are applied to the skin layers. This is accomplished by heating one or both of the laminating rolls, by preheating metal skin layers, or through the heat of extrusion of the polymeric resinous material or combination of such heating steps. The distance between the laminating rolls at the nip can be controlled to exert effective pressure to metal-polymer-metal laminate to ensure adequate bond between the metal skins and the polymer core. The laminating rolls can be covered with a layer of polytetrafluoroethylene to prevent sticking of polymeric resinous material to the rolls.

In another embodiment of this invention, the metal skin layers are first coated with an adhesive layer on one side thereof and are fed continuously to the combining nip with the coated sides facing toward each other. A layer of polymeric resinous material is disposed between the two adhesive coated skin layers by continuous extrusion as described hereinabove.

In yet another embodiment of this invention, a multi-layered extrudate comprising an adhesive layer—a core layer—an adhesive layer is disposed continuously and simultaneously between the two metal skin layers or precoated metal skin layers by the well known coextrusion process.

The present invention is not limited by the process used to prepare the metal-polymer-metal structural laminates. Extrusion processes, i.e., extrusion coating or extrusion lamination; film lamination techniques; solution coating techniques or combination of such techniques well known in the art can readily be used to produce the laminates of this invention. It is essential, however, that the thermoplastic polymeric resinous material of the adhesive layer and core layer be subjected to a temperature at least equal to the softening point thereof, for a period of time sufficient to cause the polymer to tightly adhere but not undergo significant degradation thereof, and effective pressure to achieve intimate contact between the polymer layers and the metal skin layers.

A preferred laminate with the present invention comprises steel or steel alloy skin layers, most preferably tin-free steel, each skin layer being within the range of from about 5 to 10 mils thick, with a core of ethylene homopolymers or copolymers or propylene homopolymers or copolymers having a brittle temperature of less than about 30° F. (as measured by ASTM D-746) and a Vicat softening point of greater than about 170° F. (as measured by ASTM D-1575) the total laminate thickness being within the range of from about 25 to 48 mil.

When a chrome/chrome oxide coated steel is used as the metal skin layer in laminates of this invention, the layers of chromium and of chromium oxide are too thin to be measured by conventional techniques. Therefore, their thickness is determined by the value in milligrams of chromium that can be leached from one square foot of surface of the substrate: the chromium oxide by leaching with a base, the chromium metal by leaching with an acid. Preferably, the layers are of approximately equal thickness, the chromium values for the composite coating varying between above about 0.1 mg./ft.$^2$ to about 15 mg./ft.$^2$. It is widely known that below 0.1 mg./ft.$^2$ corrosion resistance of metal substrate is unsatisfactory while above 15 mg./ft.$^2$ a cohesive failure within the coating is possible. The preferred range of values for each layer is from about 1 mg./ft.$^2$ to about 4 mg./ft.$^2$.

Chromium-in-oxide is the accepted method in the industry for reporting the thickness of the oxide layer of the coating. The chromium oxide consists essentially of $Cr^{+3}$ plus minor amounts of $Cr^{+6}$. The weight or thickness of oxide would be meaningless because of the degree of hydration is indefinite and variable. Therefore, the chromium-in-oxide value is the total non-metallic chromium leached from the substrate. In this description chromium metal value will refer to the total metallic chromium leached from the substrate.

Another preferred laminate within the present invention comprises aluminum or aluminum alloys skin layers, each skin being within the range of from about 6 to 12 mils thick, with the same preferred core material specified with the steel or steel alloy skin layers, the total laminate thickness being within the range of from about 30 to 60 mils.

With each of the preferred laminates noted above, an adhesive can be employed between the metal skin and the polymer core. The preferred adhesive layer is made from a copolymer of ethylene and an ethylenically unsaturated carboxylic acid previously described. Most preferred is an ethylene acrylic acid copolymer.

In a "no load oven test", used to determine the effect of heat on metal-plastic-metal laminates of the present invention, a metal-plastic-metal laminate is placed in a circulating-air oven maintained at a temperature of 190° F. for a period of 30 minutes. Following the test, the laminate is examined for a change in appearance, dimension or other properties or a sign of delamination between individual layers.

The specific working examples that follow are intended to illustrate the invention but are not to be taken as limiting its scope.

EXAMPLES

The following general procedures were used to make laminates within the scope of the present invention, which laminates are described in Table I. In one such procedure, two coils of metal skin material were extrusion coated on one side thereof with about 2 mils of an adhesive copolymer. Two webs of the adhesive coated metal were fed into a combining nip with the adhesive coated side facing toward each other. The combining nip was formed between a pair of opposed counter-rotating laminating rolls preheated to a temperature of about 350° F. The laminating rolls were adjusted to allow the desired amount of pressure to be applied as the webs (about 27 inches wide) passed between the rolls. A molten polymeric resin core material was forced through a slot in a sheeting die of a conventional screw type extruder at a temperature of about 400° F. into the combining nip and disposed between the two adhesive coated metal webs. The slot of the die had a generally rectangular configuration about 30 inches wide with a gap of approximately 0.016 inch. The laminating rolls had a diameter of 8 inches and were rotated at a speed of about 1.15 rpm.

A similar procedure described hereinabove, was used to make laminates of the present invention having no adhesive layers between the polymeric resin core and the metal skins. However, the initial extrusion coating step, whereby the adhesive copolymer was applied to the metal skin layers, was not employed.

In another procedure, sheets of polymeric resin core were prepared from resin granules using well known compression molding techniques. A sheet of core material was positioned between two sheets of adhesive copolymer. The three-layer assembly comprising adhesive/core/adhesive was then positioned between two metal skin layers, and the resulting assembly was placed in a molding press and was treated at a temperature of 150° C. for a period of 10 minutes under a pressure of about 20 psi. The pressure in the mold was then increased to about 100 psi. At the same time, the mold was allowed to cool to ambient temperature under the same pressure while cooling water was circulated through the platens of the molding press.

When the adhesive layer was applied in the form of powder or solvent based suspension, such layer was first applied to one side of each metal skin. Two adhesive coated metal skins were placed on each side of the polymeric core with the coated sides facing toward the core. The three-layer assembly was then placed in the mold press and laminated under the conditions described hereinabove.

Certain properties of laminates of the present invention are reported in Table II.

TABLE I

| Example Number | Laminate Construction | Laminate Thickness (mil) |
| --- | --- | --- |
| 1 (C) | 9 mil TFS(1)/2 mil EAA(2)/12 mil HDPE(3)/2 mil EAA(2)/9 mil TFS(1) | 34 |
| 2 (C) | 6 mil TFS(4)/2 mil EAA(2)/22 mil HDPE(3)/2 mil EAA(2)/6 mil TFS(4) | 38 |
| 3 (M) | 9 mil TFS(1)/2 mil EAA(5)/7 mil HDPE(3)/2 mil EAA(3)/9 mil TFS(1) | 29 |
| 4 (M) | 9 mil TFS(1)/2 mil EAA(5)/16 mil HDPE(3)/2 mil EAA(3)/9 mil TFS(1) | 38 |
| 5 (M) | 9 mil TFS(1)/2 mil EAA(5)/30 mil HDPE(3)/2 mil EAA(3)/9 mil TFS(1) | 52 |
| 6 (M) | 9 mil TFS(1)/2 mil EAA(5)/41 mil HDPE(3)/2 mil EAA(3)/9 mil TFS(1) | 63 |
| 7 (M) | 9 mil TFS(1)/2 mil PAA(6)/11 mil PP(7)/2 mil PAA(6)/9 mil TFS(1) | 33 |
| 8 (M) | 9 mil TFS(1)/2 mil PAA(8)/12 mil PP(7)/2 mil PAA(8)/9 mil TFS(1) | 34 |
| 9 (M) | 9 mil TFS(1)/2 mil EAA(5)/13 mil 10% glass fiber & HDPE(3)/ 2 mil EAA(5)/9 mil TFS(1) | 35 |
| 10 (M) | 9 mil TFS(1)/2 mil EAA(5)/10 mil 35% glass fiber & HDPE(3)/ | |

TABLE I-continued

| Example Number | Laminate Construction | Laminate Thickness (mil) |
|---|---|---|
| | 2 mil EAA(5)/9 mil TFS(1) | 32 |
| 11 (C) | 9 mil TFS(1)/14 mil HDPE(9)/9 mil TFS(1) | 32 |
| 12 (C) | 9 mil TFS(1)/2 mil EAA(2)/14 mil LDPE(10)/2 mil EAA(2)/9 mil TFS(1) | 36 |
| 13 (C) | 6 mil TFS(4)/2 mil EAA(2)/33 mil LDPE(10)/2 mil EAA(2)/6 mil TFS(4) | 49 |
| 14 (C) | 8 mil Al(11)/2 mil EAA(2)/29 mil HDPE(9)/2 mil EAA(2)/8 mil Al(1) | 49 |

Notes:
(C) - Sample prepared by continuous lamination.
(M) - Sample prepared using a molding press.
TFS(1) - Tin free steel, Type D, T-1 temper.
EAA(2) - Ethylene acrylic acid copolymer, coating, density: 0.930-0.935, 8% by weight acrylic acid, 5 M.I.
HDPE(3) - High density polyethylene, density: 0.956, 0.08 M.I.
TFS(4) - Tin free steel, Type MR, T-3 temper.
EAA(5) - Ethylene acrylic acid copolymer film, 8% by weight acrylic acid.
PAA(6) - Polypropylene acrylic acid graft copolymer powder.
PP(7) - Polypropylene.
PAA(8) - Polypropylene acrylic acid graft copolymer suspension.
HDPE(9) - High density polyethylene, density: 0.967, 0.3 M.I.
LDPE(10) - Low density polyethylene, density: 0.921, 0.7 M.I.
Al(11) - Aluminum.

TABLE II

| Example Number | Laminate/Skin Flexural Modulus Ratio (%) | Core(1)/Skin Thickness Ratio | Laminate/Skin Density Ratio (%) | Limiting Dome Height Ratio (%) | Lap Shear(2) (psi) |
|---|---|---|---|---|---|
| 1 | 74 | 1.9 | 58 | 91 | 1700 |
| 2 | 62 | 4.2 | 40 | 76 | 1400 |
| 3 | 86 | 1.3 | 66 | ND | 1400 |
| 4 | 78' | 2.3 | 53 | ND | 1400 |
| 5 | 64 | 3.9 | 42 | ND | 1400 |
| 6 | 54 | 5.2 | 37 | ND | 1400 |
| 7 | 87 | 1.7 | 59 | ND | ND |
| 8 | 82 | 1.9 | 57 | ND | ND |
| 9 | 82 | 1.9 | 58 | ND | ND |
| 10 | 89 | 1.6 | 64 | ND | ND |
| 11 | 80 | 1.7 | 61 | 88 | 1900 |
| 12 | 45 | 2.1 | 55 | ND | 1200 |
| 13 | ND | 6.0 | 34 | 79 | 1200 |
| 14 | 65* | 4.1 | 56 | ND | ND |

Notes:
(1) - Core includes adhesive layers, if any.
(2) - Values typical of this type of laminate.
ND - Not determined.
* - Calculated.

As shown in Table II, metal-plastic-metal laminates of the present invention are of light weight and can readily be formed as evidenced by relatively high values for the limiting dome height ratio. At the same time, the laminates have surprisingly high stiffness and lap shear values.

In addition, Examples 1-4 and 11-13 were tested and passed the 90° bend test. Other examples were not tested. Further, Example 13 was subjected to and passed the no load oven test.

What is claimed is:

1. A metal-polymer-metal structural laminate comprising a core of polymeric resinous material having tightly adhered to each side thereof a metal skin layer wherein each metal skin layer is from about 2 to about 20 mils thick, said laminate further having a ratio of core thickness to skin thickness of less than 9:1, and a total thickness of from about 5 to about 65 mils; the materials of construction of said polymeric core and metal skins and the geometry of the laminate being such that the laminate has a flexural stiffness at least 40% that of the solid metal of the same thickness as measured by ASTM D790 on a one inch wide sample having four inch span under three point loading conditions, a density from about 25% to 90% that of the average of two solid metal skin layers, a limiting dome height of at least about 60 percent of the limiting dome height of the solid metal of the skin layer of the lower ultimate elongation having the same thickness, the capability of being subjected to a no load oven test, subsequent to forming of said laminate, at a temperature of at least 190° F. for a period of 30 minutes without delaminating, and the capability of being bent at room temperature to 90° to a critical radius without metal rupture, the critical radius defined as the distance from the pivot point to the inner skin surface of the laminate, being about equal to the total laminate thickness.

2. The structural laminate of claim 1 wherein the metal skin layers on each side of the core are different thicknesses.

3. The structural laminate of claim 1 wherein the metal skin layers on each side of the core are of different metals.

4. The structural laminate of claim 1 wherein the core of polymeric resinous material is selected from a group consisting of homopolymers and copolymers of ethylene or propylene and having a brittle temperature of less than about 30° F. and a Vicat softening point of greater than about 170° F.

5. The structural laminate of claim 1 wherein the core of polymeric resinous material has been irradiated for improved creep properties and thermal stability.

6. The structural laminate of claim 1 wherein the core of polymeric resinous material is electroconductive.

7. The structural laminate of claim 1 having a core thickness from about 10 to 45 mils.

8. The structural laminate of claim 1 wherein the metal skin layer has a thickness of from about 5 to 15 mils.

9. The structural laminate of claim 1 wherein the polymer core does not incorporate a solid filler.

10. The structural laminate of claim 1 wherein the core of polymeric resinous material contains at least one reinforcing element embedded therein.

11. The structural laminate of claim 10 wherein the reinforcing element is an expanded metallic sheet.

12. The structural laminate of claim 1 wherein the polymeric resinous material of the core is selected from homopolymers and copolymers of propylene or ethylene having a brittle temperature of less than about 30° F. and a Vicat softening point of greater than about 170° F. and the metal skin layers are steel or steel alloys, the thickness of each skin being within the range of from about 5 to 10 mils and the total laminate thickness being within the range of from about 23 to 48 mils.

13. The structure laminate of claim 12 wherein the polymeric resinous material is high density polyethylene.

14. The structural laminate of claim 1 wherein the polymeric resinous material of the core is selected from homopolymers and copolymers of propylene or ethylene having a brittle temperature of less than about 30° F. and a Vicat softening point of greater than about 170° F. and the metal skin layers are aluminum or aluminum alloys, the thickness of each skin being within the range of from 6 to 12 mils and the total laminate thickness being within the range of from about 30 to 60 mils.

15. The structural laminate of claim 14 wherein the polymeric resinous material is high density polyethylene.

16. The structural laminate of claims 1, 10 or 12 wherein the core is tightly adhered to the metal skin layers by the use of an intermediate adhesive layer therebetween.

17. The structural laminate of claim 16 wherein the intermediate adhesive comprises a copolymer of ethylene and ethylenically unsaturated carboxylic acid.

18. The structural laminate of claim 17 wherein the carboxylic acid is acrylic acid.

* * * * *

UNITED STATES PATENT AND TRADEMARK OFFICE
CERTIFICATE OF CORRECTION

PATENT NO. : 4,313,996

DATED : February 2, 1982

INVENTOR(S) : Ritchey O. Newman et al.

It is certified that error appears in the above—identified patent and that said Letters Patent is hereby corrected as shown below:

Col. 2, line 55, please add after the word "poor" -- high temperature properties. --;

Col. 7, Table I - continued, in the fourth line under "Notes", please delete the "," after the word "coating".

Signed and Sealed this

First Day of June 1982

[SEAL]

Attest:

GERALD J. MOSSINGHOFF

Attesting Officer     Commissioner of Patents and Trademarks